United States Patent
Buckley et al.

(10) Patent No.: US 12,265,548 B2
(45) Date of Patent: Apr. 1, 2025

(54) METHOD AND SYSTEM FOR RESTORING CONSISTENCY OF A DIGITAL TWIN DATABASE

(71) Applicant: Siemens Aktiengesellschaft, Munich (DE)

(72) Inventors: Mark Buckley, Munich (DE); Rakebul Hasan, Munich (DE); Martin Ringsquandl, Raubling (DE); Johannes Maderspacher, Garmisch-Partenkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/494,627

(22) Filed: Oct. 25, 2023

(65) Prior Publication Data
US 2024/0143623 A1 May 2, 2024

(30) Foreign Application Priority Data
Oct. 31, 2022 (EP) .................................. 22204712

(51) Int. Cl.
  *G06F 16/00* (2019.01)
  *G06F 16/215* (2019.01)
  *G06F 16/27* (2019.01)
(52) U.S. Cl.
  CPC .......... *G06F 16/273* (2019.01); *G06F 16/215* (2019.01)
(58) Field of Classification Search
  CPC .............................. G06F 16/273; G06F 16/215
  See application file for complete search history.

(56) References Cited

U.S. PATENT DOCUMENTS

| | | | |
|---|---|---|---|
| 2017/0286572 A1 | 10/2017 | Hershey et al. | |
| 2020/0311110 A1* | 10/2020 | Walker | G06N 3/08 |
| 2020/0387576 A1* | 12/2020 | Brett | G06F 3/04815 |
| 2020/0394351 A1 | 12/2020 | Roemerman et al. | |
| 2021/0173969 A1 | 6/2021 | Abbey et al. | |
| 2022/0191648 A1* | 6/2022 | Smith | H04W 4/023 |
| 2022/0374855 A1* | 11/2022 | Balaoro | G06Q 20/401 |
| 2023/0351070 A1* | 11/2023 | Hartley | G06Q 30/018 |
| 2024/0119612 A1* | 4/2024 | Hemmer | G06T 19/20 |

\* cited by examiner

*Primary Examiner* — Syed H Hasan
(74) *Attorney, Agent, or Firm* — Schmeiser, Olsen & Watts LLP (57) ABSTRACT

To restore consistency of a digital twin database, identifiers with metadata imported from various data sources are processed by an encoder, which computes latent representations of the identifiers that are compared by an efficient similarity metric. If the respective similarity score exceeds a threshold, a match is detected between the identifiers. In that case, the digital twin database is updated by aligning the first identifier and the second identifier. This matching algorithm for equipment identifiers updates the digital twin data automatically and continuously by aligning identifiers which refer to the same piece of equipment. The updates flow directly into the digital twin database, thereby removing the manual effort. Using approximate nearest neighbor methods is highly efficient, especially for large plants. The encoder is implemented as an autoencoder which relies only on unlabeled training data. This unsupervised approach is more suitable for industrial scenarios where labeled data is expensive to create.

11 Claims, 4 Drawing Sheets

METHOD AND SYSTEM FOR RESTORING CONSISTENCY OF A DIGITAL TWIN DATABASE

CROSS-REFERENCE TO RELATED APPLICATIONS

This application claims priority to EP Application No. 22204712.8, having a filing date of Oct. 31, 2022, the entire contents of which are hereby incorporated by reference.

FIELD OF TECHNOLOGY

The following relates to a method and system for restoring consistency of a digital twin database.

BACKGROUND

Digital twin models of plants, buildings and other complex constructions contain information about the individual pieces of equipment which are installed in them. The digital twin provides a model of the state of the plant and helps to plan maintenance, to design updates, and to monitor operation. The value of the digital twin is based on the accuracy of the data it contains, but this data may contain errors or omissions. The cause is often in the source of the data: a digital twin is built from multiple, heterogeneous data sources provided by multiple third parties, for instance suppliers, installation contractors, or data management providers. These sources may use different identifiers, tags, names, and data schemas to refer to equipment and equipment metadata. Some sources may follow standard formats, such as KKS (German acronym for "Kraftwerk-Kennzeichnungssystem"), or MLFB (German acronym for "Maschinenlesbare Fabrikatebezeichnung"), but others may not. Discrepancies between the naming standards of different data sources prevent automatic linking and lead to incomplete information as well as inconsistencies in the digital twin database.

There are often discrepancies between data sets in real-world scenarios. In certain cases, plant engineers will diverge from and customise the naming standards by which equipment is referred to. Often such customisations remain undocumented, making it very difficult to write and maintain a rule-based solution. Typical customisation may vary greatly between industries, e.g., between electrical and chemical engineering. Simple human errors such as spelling errors or copy-paste errors can be introduced during the data ingestion phase of creating the digital twin. Errors may also occur when the relevant property information was not found while entering the tag into the system.

To re-establish the correctness of the digital twin an operator must review and correct these discrepancies, otherwise updates to equipment such as repairs and reconfigurations may not be accurately reflected in the data. This has a negative effect on plant operation. The correction of errors may well be a manual process, which is expensive and time-consuming, especially for industrial systems with many thousands of individual pieces of equipment.

In order to reconcile unmatched equipment identifiers, suitably qualified domain experts have to review the data and manually create tables of matching identifiers. This process is typically part of the "onboarding" of new data sources, for instance when a new subsystem is installed at the plant. This approach can be accurate but has the disadvantage that it is expensive and time-consuming.

SUMMARY

An aspect relates to identify a problem in the conventional art and to find a technical solution for this.

According to the method for restoring consistency of a digital twin database, the following operations are performed by components, wherein the components are software components executed by one or more processors and/or hardware components:

storing, by a digital twin database, a digital twin of an industrial system, wherein the digital twin database is inconsistent because a first identifier imported from a first data source and a second identifier imported from a second data source are stored independently from each other in the digital twin database, even though both identifiers identify a first entity of the industrial system, computing, by an encoder, latent representations of the first identifier and the second identifier, comparing, by a similarity metric, the latent representations, and computing a similarity score, and updating the digital twin database by aligning the first identifier and the second identifier if the similarity score is above a threshold.

The system for restoring consistency of a digital twin database comprises:

a digital twin database, storing a digital twin of an industrial system, wherein the digital twin database is inconsistent because a first identifier imported from a first data source and a second identifier imported from a second data source are stored independently from each other in the digital twin database, even though both identifiers identify a first entity of the industrial system, an encoder, trained for computing latent representations of the first identifier and the second identifier, a comparator, configured for comparing, by a similarity metric, the latent representations, and computing a similarity score, and an updating component, configured for updating the digital twin database by aligning the first identifier and the second identifier if the similarity score is above a threshold.

In connection with embodiments of the invention, unless otherwise stated in the description, the terms "training", "generating", "computer-aided", "calculating", "determining", "reasoning", "retraining" and the like relate to actions and/or processes and/or processing steps that change and/or generate data and/or convert the data into other data, the data in particular being or being able to be represented as physical quantities, for example as electrical impulses.

The term "computer" should be interpreted as broadly as possible, in particular to cover all electronic devices with data processing properties. Computers can thus, for example, be personal computers, servers, clients, programmable logic controllers (PLCs), handheld computer systems, pocket PC devices, mobile radio devices, smartphones, devices, or any other communication devices that can process data with computer support, processors, and other electronic devices for data processing. Computers can in particular comprise one or more processors and memory units.

In connection with embodiments of the invention, a "memory", "memory unit" or "memory module" and the like can mean, for example, a volatile memory in the form of random-access memory (RAM) or a permanent memory such as a hard disk or a Disk.

In particular, the identifiers can be aligned by storing an identity relation between the first identifier and the second identifier in the digital twin database, for example. Another possibility would be to replace the first identifier with the second identifier or vice versa in the entire digital twin database, and/or to unify metadata associated with the first identifier and the second identifier in the digital twin database.

In one case, the import of the first identifier from the first data source and the import of the second identifier from the second data source has already been completed before the method is performed. In another case, the import of the first identifier from the first data source and the import of the second identifier from the second data source is still ongoing while the method is performed.

The method and system, or at least some of their embodiments, address the problem of achieving complete, accurate consistency of the data in the digital twin in the presence of misaligned equipment data from heterogeneous sources. At least some of the embodiments use a matching algorithm for equipment identifiers and equipment metadata to update the digital twin data automatically and continuously by aligning identifiers which refer to the same piece of equipment. The updates flow directly into the digital twin database, thereby removing the manual effort of keeping the data consistent.

The method and system, or at least some of their embodiments, are more focused on true matches than generic string distance measures such as edit distance. At least some of the embodiments have higher precision because the matches they determine are more likely to be correct, thereby raising the accuracy and consistency of the digital twin database.

In an embodiment of the method, the computing operation includes:
  computing, by the encoder, latent representations for all identifiers imported from the first data source and all identifiers imported from the second data source.

This embodiment comprises the additional operation of
  forming pairs of identifiers by combining the latent representation of each identifier imported from the first data source with the latent representation of each identifier imported from the second data source, In this embodiment, the comparing operation includes:
  computing, by the similarity metric, similarity scores for all pairs.

In this embodiment, the updating operation includes:
  updating the digital twin database by aligning each pair of identifiers in the digital twin database if its similarity score is above a threshold.

An embodiment of the method comprises the additional operations of
  storing the latent representations of the identifiers imported from the first data source and the second data source as precomputed representations, in particular using an approximate nearest neighbour data structure,
  adding a new data source to the digital twin database,
  computing, by the encoder, for all identifiers imported from the new data source latent representation,
  forming pairs of identifiers by combining the latent representation of each identifier imported from the new data source with each precomputed representation,
  computing, by the similarity metric, similarity scores for all pairs,
  updating the digital twin database by aligning each pair of identifiers in the digital twin database if its similarity score is above a threshold, and
  adding the latent representations of the identifiers imported from the new data source to the precomputed representations.

This embodiment works autonomously and provides continuous updates to the digital twin database, which reduces the manual effort required to integrate new data sources and to maintain the correctness of the data.

An embodiment of the method comprises the initial operation of
  training, by a trainer with an autoencoder architecture containing the encoder and a decoder, the encoder using unlabeled training data and a loss function LF, and
  the encoder and the decoder are implemented using a sequence model architecture, in particular a long short-term memory network or a convolutional neural network.

This embodiment only requires unlabeled training data and does not require annotation of the training data, which reduces the cost of deployment. The autoencoder architecture relies only on unlabeled training data. This unsupervised approach is more suitable for industrial scenarios where labeled data is expensive to create and requires domain expertise.

This embodiment differs from known solutions by matching identifiers based on representations learned from data. In contrast, known methods rely on manual or semi-manual application of expert knowledge to achieve accurate matches.

This embodiment is designed to handle complicated real-world cases. It is flexible when compared to algorithms which use regular expressions, since these can only match identifiers whose patterns are known exactly in advance. By learning the encoder from data, it can match novel patterns and generalize beyond divergences in individual identifiers. This is an important property of the encoder: since it is trained from data it is better able to model noisy or irregular real-world data.

In another embodiment of the method, the similarity metric is implemented as cosine similarity or as an approximate nearest neighbour lookup algorithm.

Using Approximate nearest neighbor methods to implement the lookup of latent representations is highly efficient, especially for large industrial systems. In comparison, algorithms which analyze identifiers one by one or pairwise, such as regular expressions or edit distance, do not scale well to large data sets.

In another embodiment of the method, each identifier comprises a string identifier, and at least some of the identifiers also contain metadata describing an entity of the industrial system that is identified by the respective string identifier.

BRIEF DESCRIPTION

Some of the embodiments will be described in detail, with reference to the following figures, wherein like designations denote like members, wherein.

DETAILED DESCRIPTION

In the following description, various aspects of embodiments of the present invention and embodiments thereof will be described. However, it will be understood by those skilled in the art that embodiments may be practiced with only some or all aspects thereof. For purposes of explanation, specific numbers and configurations are set forth in order to provide a thorough understanding. However, it will also be apparent to those skilled in the art that the embodiments may be practiced without these specific details.

The described components can each be hardware components or software components. For example, a software component can be a software module such as a software library; an individual procedure, subroutine, or function; or, depending on the programming paradigm, any other portion of software code that implements the function of the software component. A combination of hardware components and software components can occur, in particular, if some of the effects according to embodiments of the invention are exclusively implemented by special hardware (e.g., a processor in the form of an ASIC or FPGA) and some other part by software.

Figure 1:
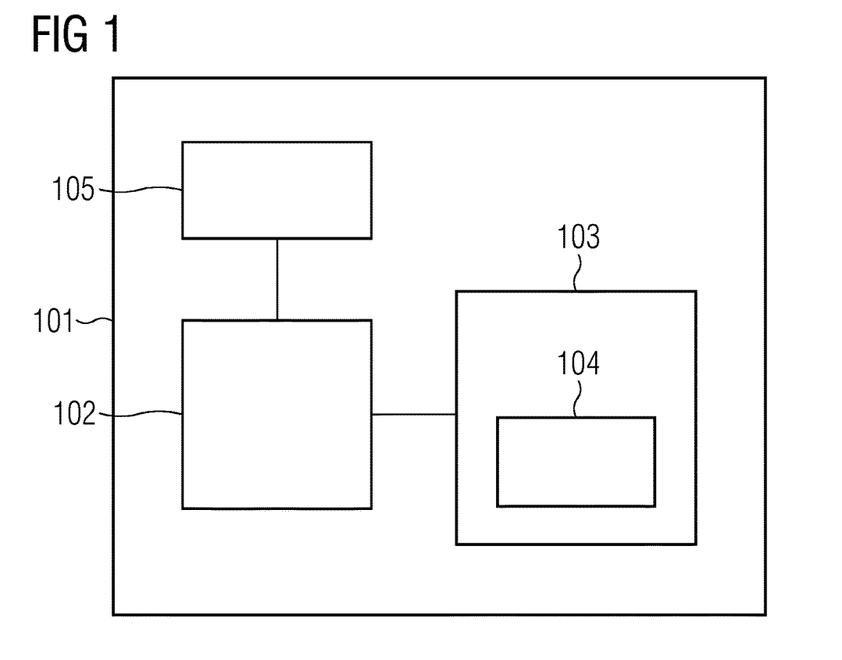
FIG. 1 shows one sample structure for computer-implementation of embodiments of the invention.

FIG. 1 shows one sample structure for computer-implementation of embodiments of the invention which comprises:

(101) computer system
(102) processor
(103) memory
(104) computer program (product)
(105) user interface In this embodiment of the invention the computer program product (non-transitory computer readable storage medium having instructions, which when executed by a processor, perform actions 104 comprises program instructions for carrying out embodiments of the invention. The computer program 104 is stored in the memory 103 which renders, among others, the memory and/or its related computer system 101 a provisioning device for the computer program product 104. The system 101 may carry out embodiments of the invention by executing the program instructions of the computer program 104 by the processor 102. Results of embodiments of the invention may be presented on the user interface 105. Alternatively, they may be stored in the memory 103 or on another suitable means for storing data.

Figure 2:
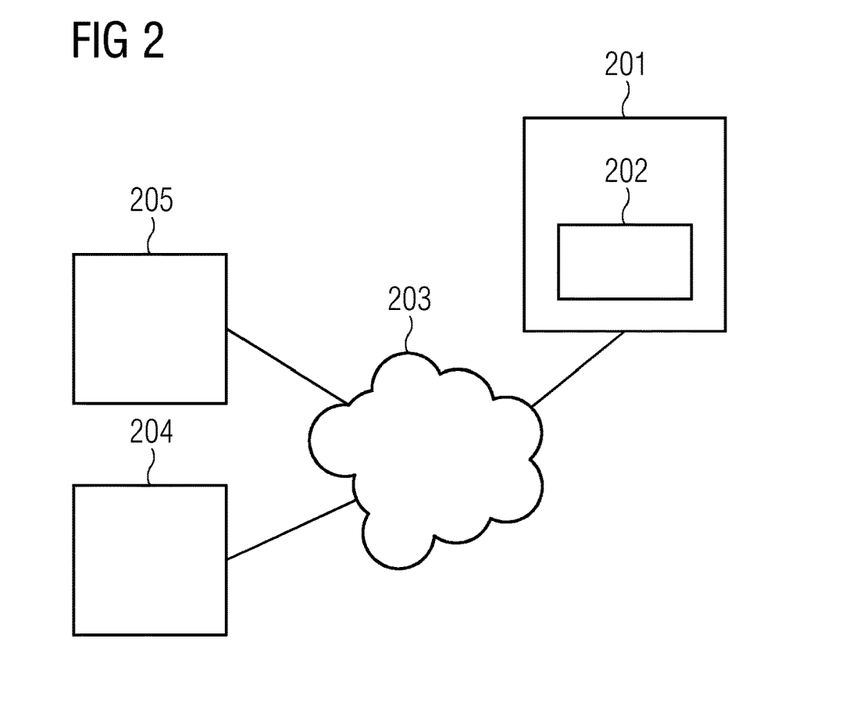
FIG. 2 shows another sample structure for computer-implementation of embodiments of the invention.

FIG. 2 shows another sample structure for computer-implementation of embodiments of the invention which comprises:

(201) provisioning device
(202) computer program (product)
(203) computer network/Internet
(204) computer system
(205) mobile device/smartphone In this embodiment the provisioning device 201 stores a computer program 202 which comprises program instructions for carrying out embodiments of the invention. The provisioning device 201 provides the computer program 202 via a computer network/Internet 203. By way of example, a computer system 204 or a mobile device/smartphone 205 may load the computer program 202 and carry out embodiments of the invention by executing the program instructions of the computer program 202.

The embodiments shown can be implemented with a structure as shown in FIG. 1 or FIG. 2.

Figure 3:
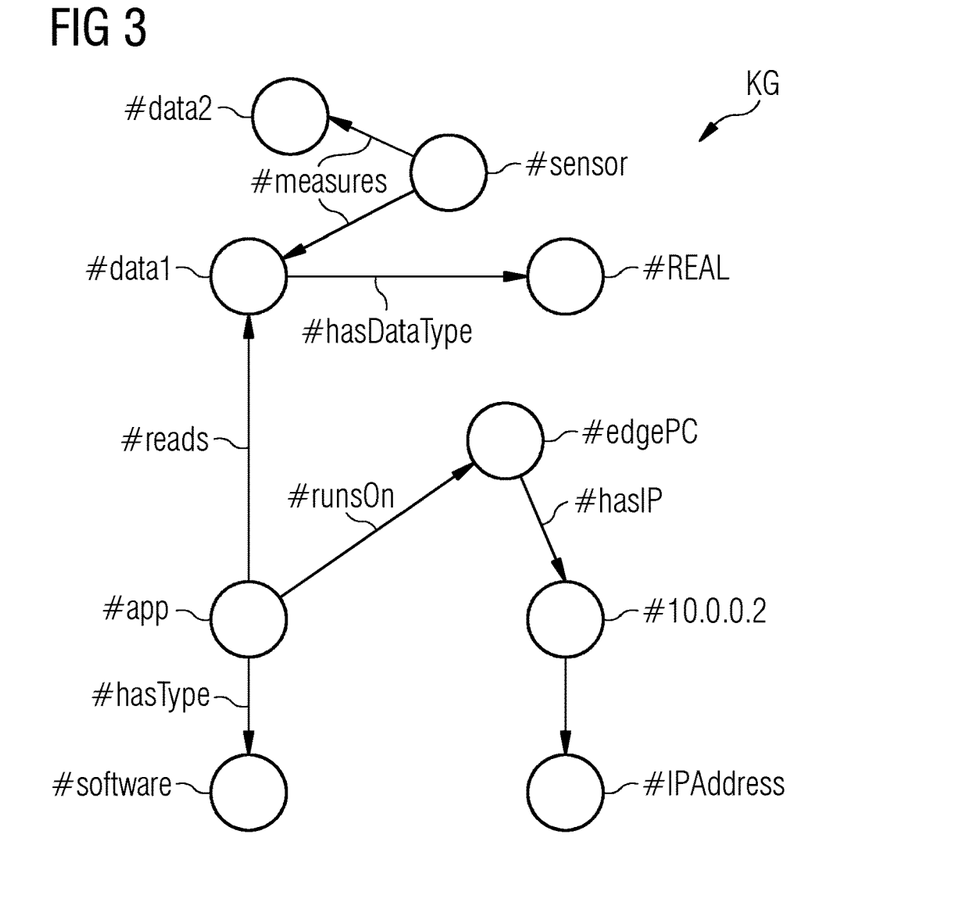
FIG. 3 shows an industrial knowledge graph KG modeling an industrial system.

FIG. 3 shows a simplified example of an industrial knowledge graph KG describing parts of an industrial system. Examples of industrial systems include power plants as well as any kind of industrial automation system such as manufacturing systems in factories, building automation systems, etc.

In general, a knowledge graph consists of nodes representing entities and edges representing relations between these entities. For instance, in an industrial system, the nodes could represent physical entities like sensors, industrial controllers like PLCs, robots, machine operators or owners, drives, manufactured objects, tools, elements of a bill of materials, or other hardware components, but also more abstract entities like attributes and configurations of the physical objects, production schedules and plans, skills of a machine or a robot, or sensor measurements. For example, an abstract entity could be an IP address, a data type or an application running on the industrial system, as shown in FIG. 3.

How these entities relate to each other is modeled with edges of different types between nodes. This way, the graph can be summarized using semantically meaningful statements, so-called triples or triple statements, that take the simple and human-readable shape 'subject—predicate—object', or in graph format, 'node—relation—node'.

Multi-relational graphs such as the industrial knowledge graph KG shown in FIG. 3 are rich data structures that can be used to model a digital twin of an industrial system. The digital twin is stored in a digital twin database—for example a graph database if the digital twin uses a graph-based model as shown in FIG. 3.

US 2017/286572 A1 discloses a digital twin. The entire contents of that document are incorporated herein by reference.

The digital twin database includes information about entities of the industrial system. As described above, these entities can be physical entities like sensors, industrial controllers like PLCs, robots, machine operators or owners, drives, manufactured objects, tools, elements of a bill of materials, or other hardware components, most of which may be summed up under the term "equipment". The entities can also be more abstract entities like attributes and configurations of the physical objects, production schedules and plans, skills of a machine or a robot, or sensor measurements. For example, an abstract entity could be an IP address, a data type, or an application running on the industrial system, as shown in FIG. 3.

Each of the above-described entities of the industrial system is identified by an individual identifier stored in the digital twin database and/or in the data sources that are fed into the digital twin database. In the following, the term "identifier" refers both to     the identifier itself, typically a string consisting of alphanumeric and punctuation characters, and     metadata about the identified entity, such as its physical properties (size, pressure, voltage, capacity etc), as well as     any textual descriptions of the entity which are included in the data source.

The metadata or the textual description may be missing in the data source, but the following embodiments expect at least an identifier string to be present for each identifier.

The digital twin database becomes inconsistent if a first identifier imported from a first data source and a second identifier imported from a second data source are stored independently from each other in the digital twin database, even though both identifiers identify the same entity of the industrial system.

The following embodiments assume that even when there are different identifiers across heterogeneous data sources referring to the same entity of the industrial system, there will be some content in these data sources, either in the identifier string or in the metadata, which makes the correspondence of the entity being referred to recognisable. For example, there will be some overlap in the identifier strings, or shared language in the textual descriptions, or an alignment of physical values in the metadata.

At least some of the embodiments operate in two phases: a training phase and a runtime phase. In the training phase, an encoder is trained from data. The encoder computes, for a given equipment identifier, a latent representation, which is a mathematical representation of the meaning and content of the identifier. Training the encoder is a one-time activity. In the runtime phase the encoder is used to compute the latent representations of the equipment identifiers in the plant and for any new data sources. The representations are compared using a standard metric such as cosine similarity, and those similarity scores above a certain threshold are considered correct and are used to update the digital twin data.

Training Phase

Figure 4:
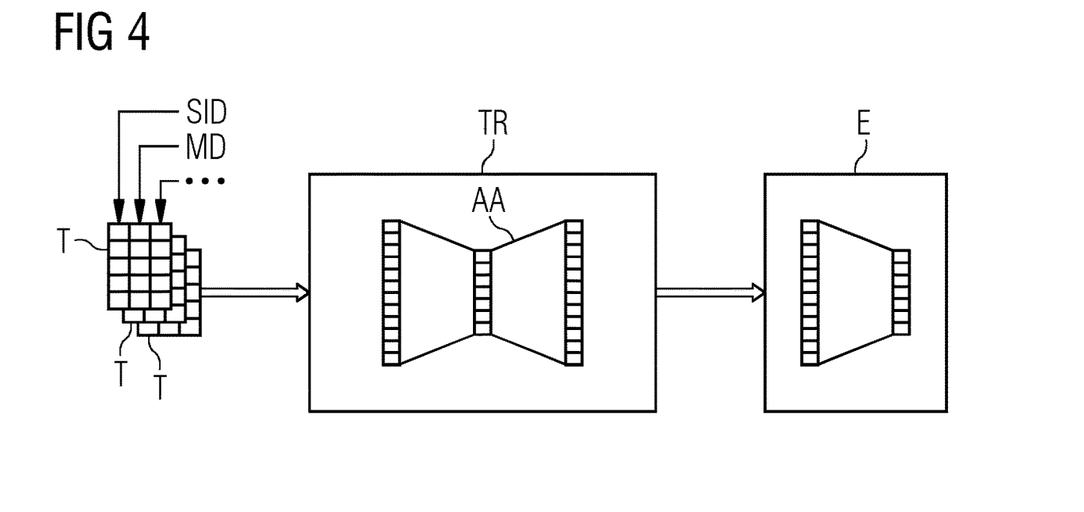
FIG. 4 shows a training procedure for training an encoder E.

FIG. 4 shows the above-mentioned training phase. Several data sources each provide a table T, which is a set of training data containing a list of identifiers comprising string identifiers SID and, optionally, metadata MD, referring to entities of an industrial system. For each table T, the respective columns of the data set should be known, for instance which column is the string identifier SID, which is a textual description, etc. The source of the training data should reflect the kinds of entities which are expected to be found in the industrial system. Good training data is for instance the data of the industrial system itself or the data from similar plants in similar industries. The highest quality training data contains tags expressing the same properties (size, pressure, voltage, capacity etc) using the same standard or schema. With this kind of data, the most accurate autoencoder can be trained.

The training phase uses a Trainer TR with an autoencoder architecture AA, the outcome of which is a trained encoder TE, which can be seen as a function of type $$\text{encode: ID} \to \mathbb{R}^d$$

where ID is a structure containing at least the string indentifier SID plus any metadata MD which is present and $\mathbb{R}^d$ is a d-dimenisonal vector of real values. After training, the expectation is that the encode function computes representations which contain all of the structural information about each identifier/the identified entity in the industrial system in order to compare them in the general case.

Figure 5:
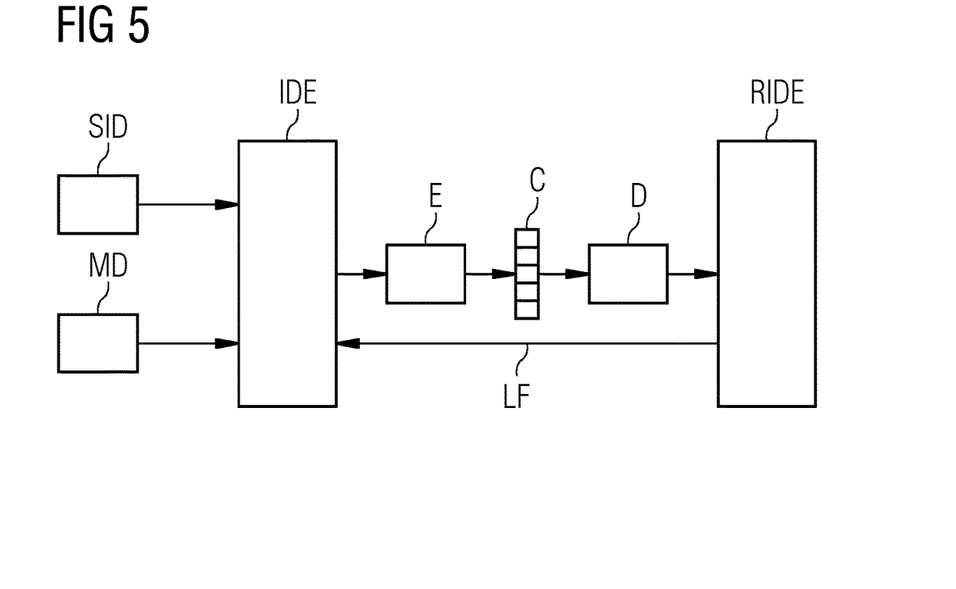
FIG. 5 shows an autoencoder architecture used for training an encoder E.

FIG. 5 shows the autoencoder architecture AA depicted as part of the trainer TR in FIG. 4 in greater detail. Its purpose is learning latent representations of identifiers. According to the embodiment, the problem is framed as a sequence to sequence (seq2seq) problem. The embodiment first encodes a string identifier ID and its associated metadata MD into an ID Embedding IDE, which is a sequence of vectors $(x_1, \ldots, x_T)$. An encoder E takes the ID embedding IDE as input and creates a lower dimensional vector C that is termed code Z. A decoder D takes the vector C as input and reconstructs the input sequence in the form of a reconstructed ID Embedding RIDE.

According to the embodiment, the model given by the autoencoder architecture shown in FIG. 5 is trained using all the identifier data available with a loss function LF that is termed L. The exact definition of the loss function LF depends on the problem instance in a given use case. In general, the degree of importance given to the identifier part or the metadata part can be controlled from the loss function LF. For the models of the encoder E and the decoder D, the embodiment uses a sequence model architecture such as a long short-term memory network (LSTM) or a convolutional neural network (CNN).

The string identifiers SID—the primary input to the model shown in FIG. 5—are composed of sequences of characters. These characters at specific positions represent specific physical properties. To preserve such properties in the string identifiers SID, the embodiment considers the characters in them and their positions as features. The metadata MD can be either identifiers or textual descriptions. For identifier metadata, the embodiment uses the same character level sequence embedding. For textual metadata, the embodiment uses existing text embedding approaches such as bag-of-words representations or dense representations using a domain adapted machine learning model for the specific use case.

The training process for the autoencoder is controlled by hyperparameters such as the loss function LF, sequence lengths for the string identifiers SID and the metadata MD, dimensionality of the vector C (code Z), and other common neural network related hyperparameters: epochs, learning rate, optimizer, number of layers, dropout-rate, etc. After performing the training step, the vector C (code Z) is used as the latent representation for the respective string identifier SID.

Runtime Phase

Figure 6:
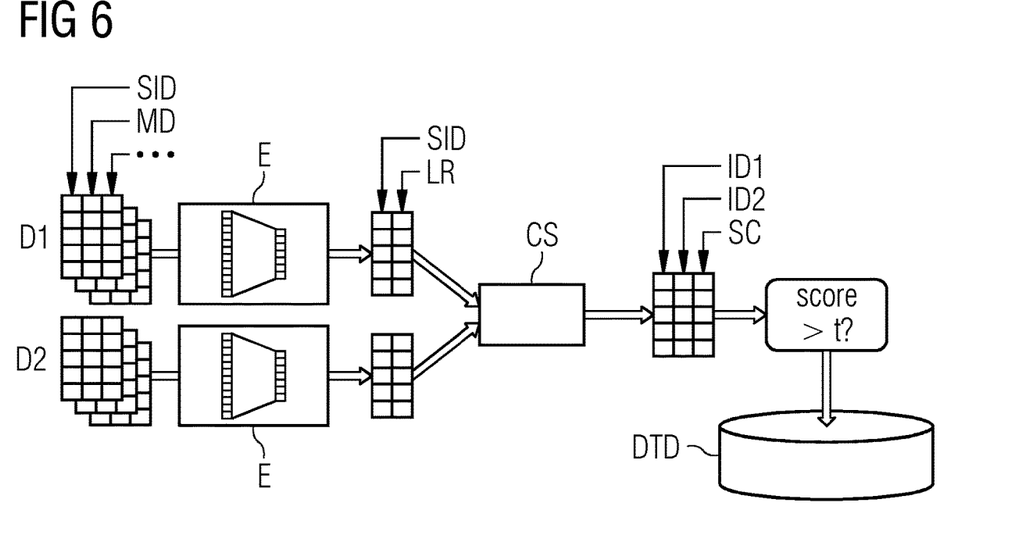
FIG. 6 shows a runtime phase at initialization time of a digital twin database DTD.

A runtime phase at initialization time of the industrial system is depicted in FIG. 6. In this example, only a first data source D1 and a second data source D2 of size n and m respectively are shown, however similar embodiments can process many additional data sources, in which case each data source must be compared to each other. The expected input from each data source is a set of tables of identifiers with known columns, as described for the training phase above.

First, the encoder E (see description of FIG. 5) is used to compute a latent representation LR for each identifier in each data source D1, D2. The embodiment then computes a similarity score SC, in this case the cosine similarity CS, for each pair of latent representations LR, i.e. the set {(encode $(id_1)$, encode$(id_2)$): $id_i \in D_1$ and $id_2 \in D_2$}, leading to a table of records of type ($id_i$, $id_2$, similarity score). For example, a similarity score SC is calculated for a first identifier ID1 from the first data source D1 and a second identifier ID2 from the second data source D2. Next, the embodiment applies a configurable threshold t to the similarity scores SC to find those pairs which represent identifiers which match. The embodiment finally inserts these matches into a digital twin database DTD, thereby increasing its data consistency and the accuracy of the entity links. Identifier pairs whose similarity score SC is below the threshold are discarded.

The computation of similarity scores for all n×m pairs of identifiers would be very costly. An exemplary embodiment therefore uses an approximate nearest neighbour lookup which, for a given latent representation, efficiently finds the other representations with the largest similarity scores. Approximate nearest neighbour methods are well known in the conventional art. There is a minor trade-off of efficiency against numeric accuracy of the similarity scores, but since the ranking is more important than the absolute score, this implementation does not affect the accuracy of the updates to the digital twin database DTD.

Figure 7:
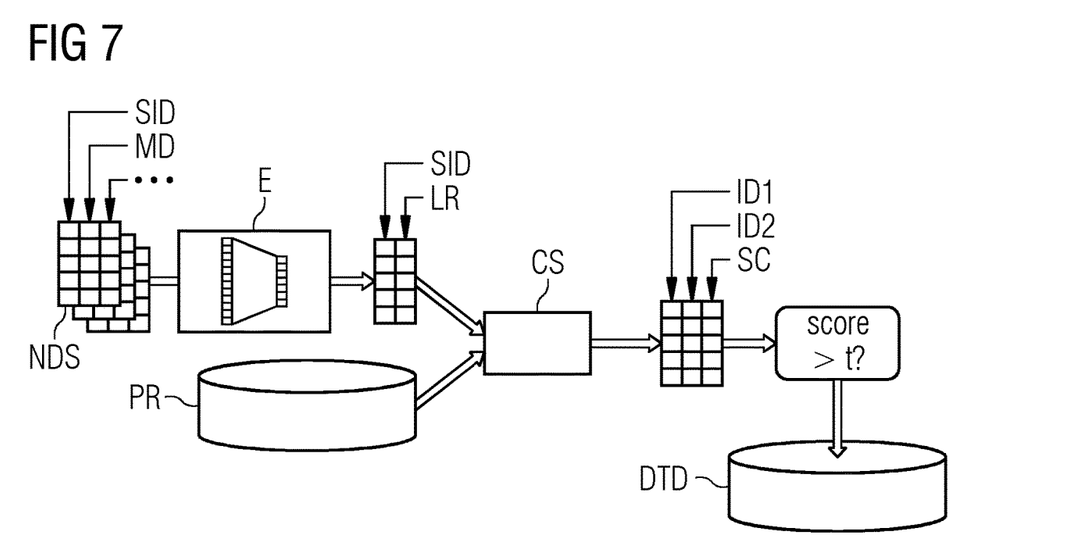
FIG. 7 shows a runtime phase for a continual maintenance of a digital twin database DTD.

A runtime phase for a continual maintenance of digital twin database consistency is depicted in FIG. 7. This scenario occurs when a new data source NDS is added to the industrial system and needs to be integrated into the digital twin database DTD. In this case, a set of latent representations for the pre-existing identifiers/entities in the digital twin database DTD is precomputed and stored in a suitable lookup database as precomputed representations PR, for instance an approximate nearest neighbour data structure as outlined above. For the new identifiers in the new data source NDS (each containing a string identifier SID and corresponding metadata MD), latent representations LR are computed using the encoder E as before. For each new identifier, similarity scores SC to pre-existing identifiers as represented by the precomputed representations PR are computed using cosine similarity CS and ranked, and the threshold is applied as above. The resulting matches are written to the digital twin database DTD to update it to reflect the matched entities which appear in the new data source NDS. The newly computed latent representations LR are then added to the precomputed representations PR, for example the described approximate nearest neighbour data structure, so that they will be used in subsequent rounds of matching.

Optional Post-Hoc Analysis

A further application of the latent representations of the identifiers is the ability to inspect their relationships by clustering. By clustering the identifiers and projecting them into two-dimensional space (such methods are well known in the conventional art) the approach of using a dedicated encoder allows groups within the set of equipment identifiers to be recognised, explored, and if necessary corrected. Although this is not the core function of the described embodiments, it is a side-effect which enables expert review of the operation of the embodiments.

Figure 8:
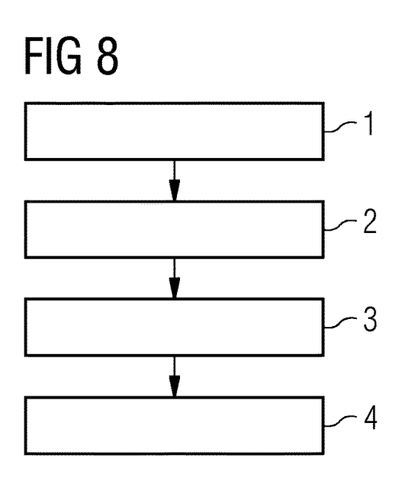
FIG. 8 shows a flowchart of a possible exemplary embodiment of a method for restoring consistency of a digital twin database.

FIG. 8 shows a flowchart of a possible exemplary embodiment of a method for restoring consistency of a digital twin database.

In a storing operation (1), a digital twin database stores a digital twin of an industrial system, wherein the digital twin database is inconsistent because a first identifier imported from a first data source and a second identifier imported from a second data source are stored independently from each other in the digital twin database, even though both identifiers identify a first entity of the industrial system.

The import from the first and second data source may be completed or still ongoing while the remaining operations are performed.

In a computing operation (2), an encoder computes latent representations of the first identifier and the second identifier.

In a comparing operation (3), a similarity metric compares the latent representations and computes a similarity score.

In an updating operation (4), the digital twin database is updated by aligning the first identifier and the second identifier if the similarity score is above a threshold.

For example, the method can be executed by one or more processors. Examples of processors include a microcontroller or a microprocessor, an Application Specific Integrated Circuit (ASIC), or a neuromorphic microchip, in particular a neuromorphic processor unit. The processor can be part of any kind of computer, including mobile computing devices such as tablet computers, smartphones or laptops, or part of a server in a control room or cloud.

The above-described method may be implemented via a computer program product including one or more computer-readable storage media having stored thereon instructions executable by one or more processors of a computing system. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer implemented method for restoring consistency of a digital twin database of an industrial system, wherein the following operations are performed by components, and wherein the components are software components executed by one or more processors and/or hardware components:

storing, by a digital twin database, the digital twin of the industrial system, wherein the digital twin database is inconsistent because a first identifier imported from a first data source and a second identifier imported from a second data source are stored independently from each other in the digital twin database, even though both identifiers identify a first entity of the industrial system, computing, by an encoder, latent representations of the first identifier and the second identifier, comparing, by a similarity metric, the latent representations, and computing a similarity score, and updating the digital twin database by aligning the first identifier and the second identifier if the similarity score is above a threshold.

2. The method according to claim 1, wherein the computing operation includes computing, by the encoder, latent representations for all identifiers imported from the first data source and all identifiers imported from the second data source, with the additional operation of
forming pairs of identifiers by combining the latent representation of each identifier imported from the first data source with the latent representation of each identifier imported from the second data source,
wherein the comparing operation includes
computing, by the similarity metric, similarity scores for all pairs, and
wherein the updating operation includes
updating the digital twin database by aligning each pair of identifiers in the digital twin database if its similarity score is above a threshold.

3. The method according to claim 2, with the additional operations of
storing the latent representations of the identifiers imported from the first data source and the second data source as precomputed representations, using an approximate nearest neighbour data structure,
adding a new data source to the digital twin database, the new data source including a plurality of identifiers,
computing, by the encoder, for all identifiers from the new data source, latent representation,
forming pairs of identifiers by combining the latent representation of each identifier imported from the new data source with each precomputed representation,
computing, by the similarity metric, similarity scores for all pairs,
updating the digital twin database by aligning each pair of identifiers in the digital twin database if its similarity score is above a threshold, and
adding the latent representations of the identifiers imported from the new data source to the precomputed representations.

4. The method according to claim 1,
with the initial operation of training, by a trainer with an autoencoder architecture containing the encoder and a decoder, the encoder using unlabeled training data and a loss function LF, and
wherein the encoder and the decoder are implemented using a sequence model architecture, in particular a long short-term memory network or a convolutional neural network.

5. The method according to claim 1,
wherein the similarity metric is implemented as cosine similarity or as an approximate nearest neighbour lookup algorithm.

6. The method according to claim 1,
wherein each identifier comprises a string identifier, and wherein at least some of the identifiers also contain metadata describing an entity of the industrial system that is identified by the respective string identifier.

7. The method according to claim 1, wherein aligning the first identifier and the second identifier includes storing an identity relation between the first identifier and the second identifier in the digital twin database, replacing the first identifier with the second identifier or vice versa in the digital twin database, and/or unifying metadata associated with the first identifier and the second identifier in the digital twin database.

8. A system for restoring consistency of a digital twin database of an industrial system, comprising:
a digital twin database, storing the digital twin of the industrial system, wherein the digital twin database is inconsistent because a first identifier imported from a first data source and a second identifier imported from a second data source are stored independently from each other in the digital twin database, even though both identifiers identify a first entity of the industrial system,
at least one processor, wherein the at least one processor is configured for computing latent representations of the first identifier and the second identifier; configured for comparing, by a similarity metric, the latent representations, and computing a similarity score; and configured for updating the digital twin database by aligning the first identifier and the second identifier if the similarity score is above a threshold.

9. A computer program product, comprising a computer readable hardware storage device having computer readable program code stored therein, said program code executable by a processor of a computer system to implement a method with program instructions for carrying out the method according to claim 1.

10. A provision device for the computer program product according to claim 9 wherein the provision device stores and/or provides the computer program product.

11. The system according to claim 8, wherein aligning the first identifier and the second identifier includes storing an identity relation between the first identifier and the second identifier in the digital twin database, replacing the first identifier with the second identifier or vice versa in the digital twin database, and/or unifying metadata associated with the first identifier and the second identifier in the digital twin database.

* * * * *